US011324204B2

(12) United States Patent
McCoy (10) Patent No.: US 11,324,204 B2
(45) Date of Patent: May 10, 2022

(54) INSULATING WRAP FOR BEEHIVES

(71) Applicant: Steve McCoy, Dunkirk, OH (US)

(72) Inventor: Steve McCoy, Dunkirk, OH (US)

( * ) Notice: Subject to any disclaimer, the term of this patent is extended or adjusted under 35 U.S.C. 154(b) by 0 days.

(21) Appl. No.: 16/654,756

(22) Filed: Oct. 16, 2019

(65) Prior Publication Data

US 2020/0229403 A1   Jul. 23, 2020

Related U.S. Application Data

(60) Provisional application No. 62/764,811, filed on Aug. 16, 2018.

(51) Int. Cl.
*A01K 47/06*   (2006.01)

(52) U.S. Cl.
CPC .................................. *A01K 47/06* (2013.01)

(58) Field of Classification Search
CPC ...... A01K 47/06; A47L 15/4209; A47J 41/00; B64C 1/40; A45C 7/00; A45C 7/0036
USPC ........................................ 229/198.2; 190/107
See application file for complete search history.

(56) References Cited

U.S. PATENT DOCUMENTS

| 413,239 | A | * | 10/1889 | Merriman | ............... | A01K 47/00 |
| | | | | | | 449/16 |
| 2,026,961 | A | * | 1/1936 | Brodt | ...................... | D06F 83/00 |
| | | | | | | 38/140 |
| 2,340,219 | A | * | 1/1944 | Hawkins | ................ | A01K 47/00 |
| | | | | | | 449/35 |
| 2,599,141 | A | | 6/1952 | Taylor | | |
| 3,438,070 | A | * | 4/1969 | Florance | ................ | A01K 47/06 |
| | | | | | | 449/2 |
| 4,199,832 | A | * | 4/1980 | Glasscock | .............. | A01K 47/00 |
| | | | | | | 156/78 |
| 4,983,139 | A | | 1/1991 | Kretschmann | | |
| 6,048,099 | A | * | 4/2000 | Muffett | .................. | A45C 11/20 |
| | | | | | | 383/110 |

(Continued)

FOREIGN PATENT DOCUMENTS

| CA | 2738913 A1 | 10/2012 |
| CN | 207329048 U  *  | 5/2018 |

(Continued)

OTHER PUBLICATIONS

Owens Corning, Owens Corning Rigid Foam Board, Dec. 9, 2020 (Year: 2020).*
Beehive Winter Insulation Wrap—Big Shrimpy, Phone, 406-839-5690.

*Primary Examiner* — Brady W Frazier
*Assistant Examiner* — Zoe Tam Tran (57) ABSTRACT

An insulating wrap for a bee hive includes four rigid foam board cores having upper and lower edges. A single piece cover wraps around the lower edges of the rigid foam board cores and is stitched together along their upper edges. The stitched seam along the upper edges of the rigid foam board cores defines a standing or projecting seam. The single piece cover is stitched together along corner seams between each of the rigid foam board cores and along end seams. A closure connects the ends of the insulating wrap adjacent to the end seams. The insulating wrap wraps around the hive bodies of the bee hive so that the standing or projecting seam is adjacent to the hive lid and may act as a seal against the hive lid, or may provide a tightly controlled gap between the insulating wrap and the hive lid.

20 Claims, 4 Drawing Sheets

(56) References Cited

U.S. PATENT DOCUMENTS

| | | | |
|---|---|---|---|
| 8,113,416 B2* | 2/2012 | Yan .................... | B31F 1/0038 |
| | | | 229/198.2 |
| 8,851,144 B2 | 10/2014 | Forbis et al. | |
| 2005/0211839 A1* | 9/2005 | Movsesian .............. | B64C 1/40 |
| | | | 244/119 |
| 2009/0057308 A1* | 3/2009 | Rothschild ........... | A63H 33/006 |
| | | | 220/7 |
| 2013/0005216 A1* | 1/2013 | Rittberger .............. | A01K 47/02 |
| | | | 449/13 |
| 2014/0023295 A1* | 1/2014 | Wagner ................... | A45C 7/00 |
| | | | 383/4 |
| 2015/0264896 A1 | 9/2015 | Peeples | |
| 2018/0116182 A1* | 5/2018 | Frey ....................... | A01K 47/06 |
| 2018/0368500 A1* | 12/2018 | Pollock .................. | A41H 9/00 |

FOREIGN PATENT DOCUMENTS

| | | |
|---|---|---|
| GB | 2495789 A | 1/2012 |
| GB | 2508135 A | 5/2014 |
| JP | 5750354 B2 | 7/2015 |
| KR | 20190038703 | 4/2019 |

* cited by examiner

INSULATING WRAP FOR BEEHIVES

CROSS-REFERENCE TO RELATED APPLICATIONS

The present application claims priority to U.S. Provisional No 62/764,811, filed Aug. 16, 2018, the entire contents of all of which are herein incorporated by reference.

BACKGROUND

Field of Invention

Embodiments of the present invention described herein generally relate to an Improved Insulating Wrap for Bee Hives, and more specifically to an insulating wrap that is easy to install and remove, provides a consistent barrier against the entry of cold air and heat loss, is resistant to weather and pests, is simple to manufacture, and is easy to store when not in use.

Related Art

"Beekeeping (or apiculture) is the maintenance of bee colonies, commonly in man-made hives, by humans . . . . A beekeeper (or apiarist) keeps bees in order to collect their honey and other products that the hive produces (including beeswax, propolis, flower pollen, bee pollen, and royal jelly), to pollinate crops, or to produce bees for sale to other beekeepers . . . . In the United States, the Langstroth hive is commonly used" Wikipedia.org, Beekeeping, (last visited Aug. 3, 2018). "The hive is the man-made structure in which the honey bee colony lives. Over the years a wide variety of hives have been developed. Today most beekeepers in the United States use the Langstroth or modern ten-frame hive." Beekeeping Basics, College of Agricultural Sciences, Cooperative Extension, The Pennsylvania State University, Mid-Atlantic Apiculture Research and Extension Consortium, 7 (2004). "[T]he Langstroth hive permits development of a strong colony and production of a large honey crop. With it the beekeeper has control over the bees. It is simple in design, mobile, light, durable, and economical . . . . Several variations of the Langstroth hive are used to a limited extent. They include the 8-frame Langstroth, . . . , the 12-frame Langstroth, . . . The most popular is the full-depth 10-frame Langstroth for both brood nest and honey storage . . . . The best type of hive under most conditions is the Langstroth 10-frame hive." Spencer M. Riedel, Development of American Beehive, Beekeeping in The United States, Agriculture Handbook No. 335, United States Department of Agriculture, 8 (1967).

"As temperatures drop, the bees draw closer together to conserve heat . . . . As the temperature rises and falls, the cluster expands and contracts . . . . During warm periods, the cluster shifts its position to cover new areas of comb containing honey. An extremely prolonged cold spell can prohibit cluster movement, and the bees may starve to death only inches away from honey." Norbert M. Kauffeld, *Seasonal Cycle of Activities in Honey Bee Colonies, Beekeeping in The United States* at 6. (Emphasis added). Historically, bee keepers insulated beehives with three inches of sawdust. However, sawdust deteriorates and absorbs moisture. "For additional protection from cold winters, many colonies are 'packed,' that is, wrapped with insulation and tar paper, leaving only the entrance exposed. Winter loss is usually high and is replaced with package bees and queens purchased from southern beekeepers." William P. Nye, *Beekeeping Regions in the United States, Beekeeping in The United States* at 19. (Emphasis added).

There are several reasons for high winter losses in bee populations in conventionally insulated bee hives. One reason is the fact that tar paper absorbs a large amount of solar heat during the day, so that the hive experiences too great of a temperature swing between night and day, insulation notwithstanding. The tar paper and insulation is typically installed semi-permanently, with the intention that it remain in place through the winter. As such, it may not easily be removed and reinstalled to compensate for unseasonable variations in temperature. Furthermore, tar paper and/or conventional insulation is typically installed by hand on each bee hive, so that installation may be haphazard, uneven, and sloppy, with gaps that allow entry and circulation of cold air. Other attempted solutions, such as cardboard dipped in paraffin or fiberglass wrap, suffer similar deficiencies, as well as attracting mice and other pests.

Accordingly, there is yet an unmet need for a method and apparatus for reducing winter losses in bee populations by appropriately insulating bee hives when needed, providing ease of removal and reinstallation when necessary, providing a good fit and even coverage without being time consuming to install, and providing good resistance to weather and pests.

SUMMARY

Embodiments of the Improved Insulating Wrap for Bee Hives described herein relate to such a method and apparatus for appropriately insulating bee hives when needed, and providing easy and convenient removal and reinstallation when necessary. The Improved Insulating Wrap for Bee Hives functions by providing an insulating wrap that encircles bee hives in order to keep the bees therein from freezing to death. The Improved Insulating Wrap for Bee Hives may be designed to fit, as a non-limiting example, the two deep ten frame and eight frame Langstroth bee hive, which are the majority of hives in use in the United States today. The Improved Insulating Wrap for Bee Hives provides excellent fit and even coverage, and is resistant to weather and pests. The Improved Insulating Wrap for Bee Hives is simple to manufacture and easy to store when not in use.

The Improved Insulating Wrap for Bee Hives includes a single piece weather proof inner and outer cover that encompasses four rigid foam board cores. Each of the rigid foam board cores is encased within its own envelope as defined by the single piece weather proof inner and outer cover, which is wrapped around the lower edges of the rigid foam board cores and stitched together along the upper edges of the rigid foam board cores using an upper standing or projecting seam with extended seam allowances. The rigid foam board cores are separated from each other by corner seams that act as living hinges between each of the four rigid foam board cores. The ends of the single piece weather proof inner and outer cover are also closed by seams, so that the first and fourth rigid foam board cores are fully enveloped as well. The single piece weather proof inner and outer cover may be constructed of waterproof, weather resistant, and pest resistant fabric, such as black 18-ounce marine vinyl coated polyester, as a non-limiting example. The four rigid foam board cores may be constructed of a rigid foam board with fixed and well-controlled insulating value, such as ½ inch pink rigid foam board insulation with an R-value of 3, commonly sold by Owens Corning®, as a non-limiting example. The upper standing or projecting seam may be plain stitched, double stitched, welted, double welted, piped, corded, bonded, or welded seam, as non-limiting examples, and may be stitched with nylon thread.

The Improved Insulating Wrap for Bee Hives may be attached to the body of the Langstroth bee hive by holding both ends of the insulating wrap with the sewn seem at the top, lifting the insulating wrap over the hive, and placing it tight around the hive. The hook and loop fastener strips are then engaged, in order to hold the insulating wrap in place. This Improved Insulating Wrap for Bee Hives provides the hive body protection from wind, freezing rain, and snow. The insulating wrap provides sufficient insulation for the bees to maintain the warmth they create in the hive, thereby allowing them to feed, maintain their numbers, and take care of the queen through the winter and early spring.

According to one embodiment of the Improved Insulating Wrap for Bee Hives, a bee hive is provided with an insulating wrap. The bee hive has at least one hive body, a hive lid, and a bottom board. The bottom board defines an entrance to the at least one hive body. The insulated wrap encompasses the at least one hive body from the top of the bottom board to adjacent to the hive lid. The insulating wrap includes four rigid foam board cores having lower edges and upper edges. A single piece inner and outer cover wraps around the lower edges of the four rigid foam board cores and is stitched together along the upper edges of the four rigid foam board cores. The stitched seam along the upper edges of the four rigid foam board cores defines a standing or projecting seam. The single piece inner and outer cover is stitched together along corner seams between each of the four rigid foam board cores and along end seams. A closure is adapted to connect the ends of the insulating wrap adjacent to the end seams.

According to another embodiment of the Improved Insulating Wrap for Bee Hives, an insulating wrap for a bee hive includes four rigid foam board cores having lower edges and upper edges. A single piece inner and outer cover wraps around the lower edges of the four rigid foam board cores and is stitched together along the upper edges of the four rigid foam board cores. The stitched seam along the upper edges of the four rigid foam board cores defines a standing or projecting seam. The single piece inner and outer cover is stitched together along corner seams between each of the four rigid foam board cores and along end seams. A closure is adapted to connect the ends of the insulating wrap adjacent to the end seams.

According to another embodiment of the Improved Insulating Wrap for Bee Hives, a method for insulating bee hives includes several steps. The first step is constructing an insulating wrap by wrapping a single piece inner and outer cover around the lower edges of four rigid foam board cores and stitching the single piece inner and outer cover together along the upper edges of the four rigid foam board cores. The second step is defining a standing or projecting seam using the stitched seam along the upper edges of the four rigid foam board cores. The third step is stitching together the single piece inner and outer cover along corner seams between each of the four rigid foam board cores and along end seams. The fourth step is adapting a closure to connect the ends of the insulating wrap adjacent to the end seams. The fifth step is encompassing with the insulated wrap at least one hive body of the bee hive from the top of a bottom board of the bee hive to adjacent to a hive lid of the bee hive.

By using a single piece weather proof inner and outer cover that is wrapped around the lower edges of the rigid foam board cores and stitched together along the upper edges of the rigid foam board core, and stitched together between each of the four rigid foam board cores and stitched closed at both ends, the arrangement of the Improved Insulating Wrap for Bee Hives is simple and efficient to manufacture. The use of marine vinyl coated polyester, rigid foam board, and nylon thread in the construction of the Improved Insulating Wrap for Bee Hives results in an insulating wrap that is durable and will last for many years.

DESCRIPTION OF THE DRAWINGS

The above-mentioned and other features of embodiments of the Improved Insulating Wrap for Bee Hives, and the manner of their working, will become more apparent and will be better understood by reference to the following description of embodiments of the Improved Insulating Wrap for Bee Hives taken in conjunction with the accompanying drawings, wherein.

Corresponding reference numbers indicate corresponding parts throughout the several views. The exemplifications set out herein illustrate embodiments of the Improved Insulating Wrap for Bee Hives, and such exemplifications are not to be construed as limiting the scope of the claims in any manner.

DETAILED DESCRIPTION

Figure 1:
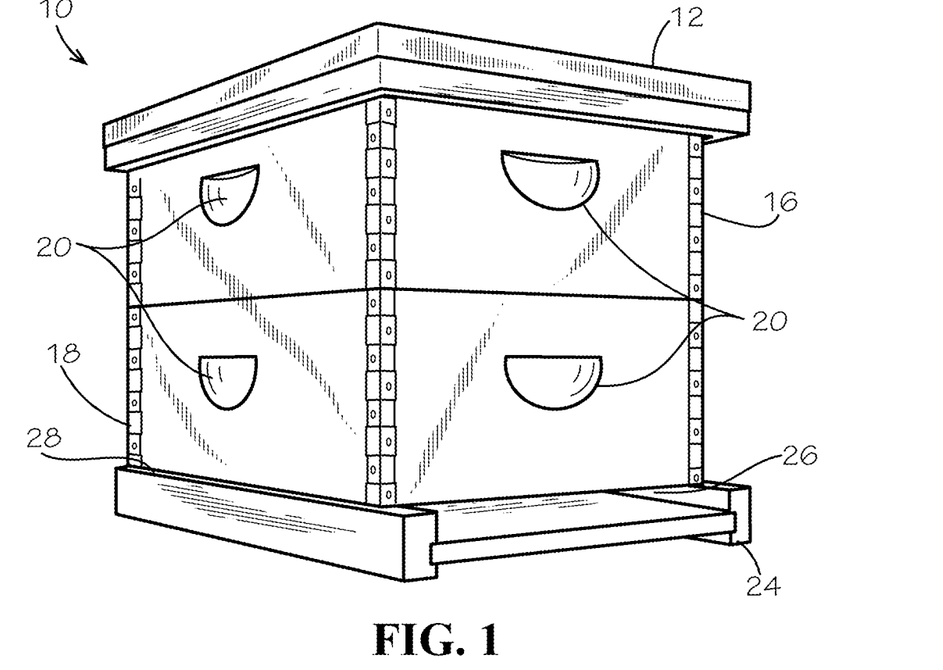
FIG. 1 is a side perspective view of a Langstroth hive, as described herein.
Figure 2:
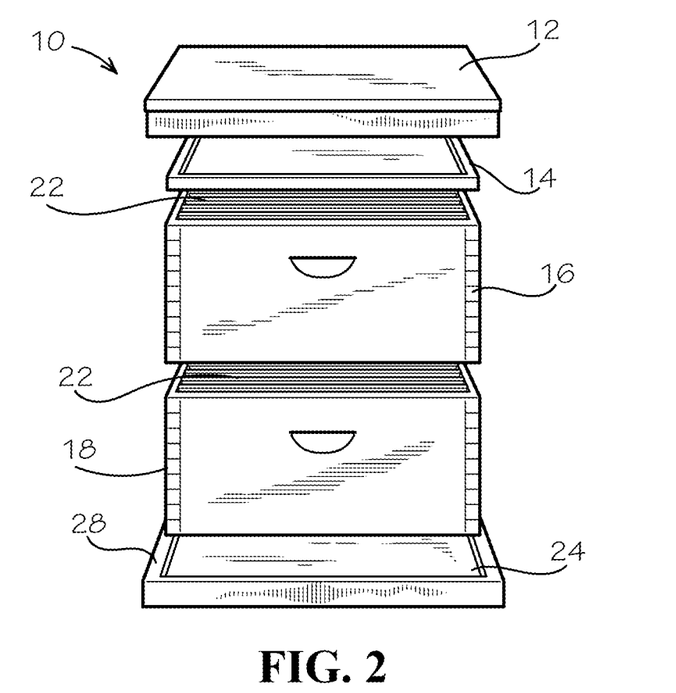
FIG. 2 is a front perspective exploded view of a Langstroth hive, as described herein.

Referring now to FIGS. 1 and 2, embodiments of a Langstroth bee hive 10 are shown. The Langstroth bee hive 10 is provided with a hive lid or outer cover 12, which serves to prevent rain from entering the bee hive 10. The hive lid or outer cover 12 sits atop one or more upper hive bodies 16 and one or more lower hive bodies 18. The one or more upper hive bodies 16 and the one or more lower hive bodies 18 function to contain frames 22, upon which bees build their honeycomb and raise their broods. An inner cover 14 may be provided between the uppermost upper hive body 16 and the hive lid or outer cover 12. The lowermost lower hive body 18 sits atop a bottom board 24, which is provided with an entrance 26 between the lowermost lower hive body 18 and the bottom board 24. The bottom board 24 may further be provided with a ledge 28 extending beyond the lowermost lower hive body 18. Bees are able to enter the Langstroth bee hive 10 by way of the entrance 26, and are able to engage in building their hive in the closely controlled spaces between the frames 22 and the outer structure of the one or more upper hive bodies 16 and the one or more lower hive bodies 18. Each of the one or more upper hive bodies 16 and the one or more lower hive bodies 18 may be provided with hive body handles 20 for easy lifting.

Figures 3, 3A, 4:
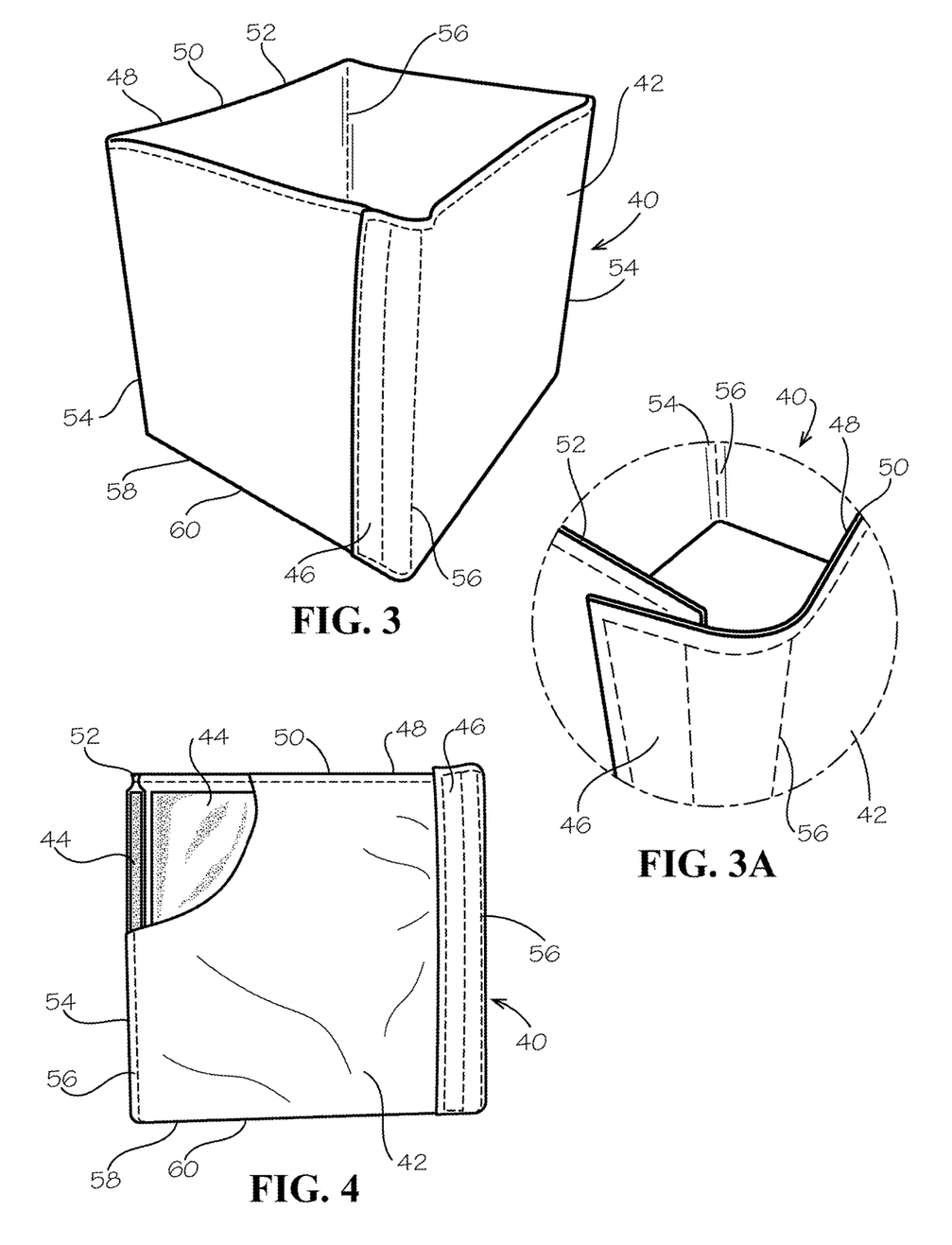
FIG. 3 is a top perspective view of an embodiment of the Improved Insulating Wrap for Bee Hives, as described herein.
FIG. 3A is a top perspective detail view of an embodiment of the Improved Insulating Wrap for Bee Hives, as described herein.
FIG. 4 is a front cutaway view of an embodiment of the Improved Insulating Wrap for Bee Hives, as described herein.

Turning now to FIGS. 3, 3A, and 4, embodiments of the Improved Insulating Wrap for Bee Hives are shown. The insulating wrap 40 is constructed from a single piece weather proof inner and outer cover 42 that encompasses four rigid foam board cores 44. As mentioned previously, the single piece weather proof inner and outer cover 42 may be constructed of waterproof, weather resistant, and pest resistant fabric, such as black 18-ounce marine vinyl coated polyester, as a non-limiting example. Also as mentioned previously, the four rigid foam board cores 44 may be constructed of a rigid foam board with fixed and well-controlled insulating value, such as ½ inch pink rigid foam board insulation with an R-value of 3, commonly sold by Owens Corning®, as a non-limiting example.

The single piece weather proof inner and outer cover 42 is wrapped 60 around the lower edges 58 of the four rigid foam board cores 44, and is stitched together along the upper edges 48 of the four rigid foam board cores 44 using an upper standing or projecting seam 50. The upper standing or projecting seam 50 is provided with an extended seam allowance 52, the purpose of which will be explained below. As mentioned previously, the upper standing or projecting seam 50 may further be embodied as a plain stitched, double stitched, welt, double welt, piped, corded, bonded, or welded seam, as non-limiting examples, and may again be stitched using nylon thread.

Each of the four rigid foam board cores 44 is separated from the next by a corner seam 56 located at corners 54. The corner seams 56 function in conjunction with the flexibility of the single piece weather proof inner and outer cover 42 as living hinges between each of the four rigid foam board cores 44. The ends of the single piece weather proof inner and outer cover 42 are also closed by seams, so that the first and fourth rigid foam board cores 44 are fully enveloped as well. When arranged in a quadrilateral and when the hook and loop closure 46 is closed, the insulating wrap 40 is relatively vertically rigid, due to the structure provided by the four rigid foam board cores 44. The hook and loop closure 46, which may be Velcro®, as a non-limiting example, may be embodied as a heavy-duty one-inch-wide continuous strip of hook and loop closure.

Figure 5:
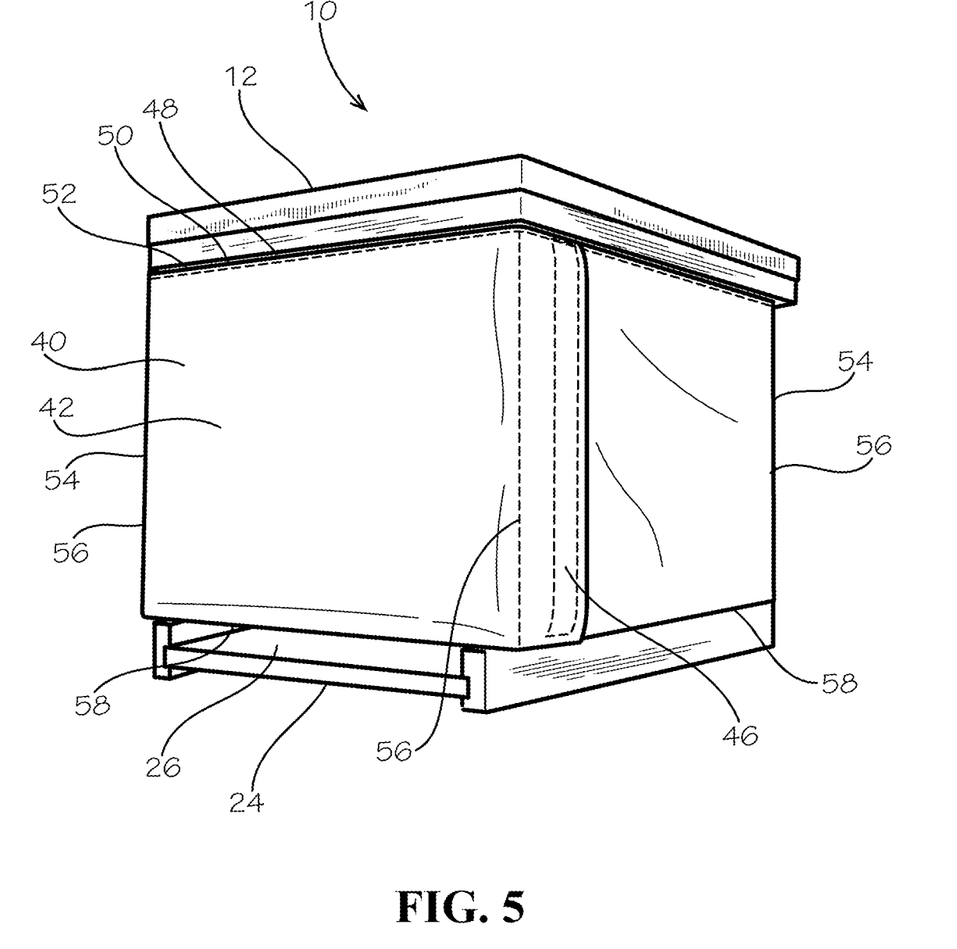
FIG. 5 is a side perspective view of an embodiment of the Improved Insulating Wrap for Bee Hives installed on a Langstroth hive, as described herein.

Turning now to FIG. 5, the insulating wrap 40 is shown installed on a Langstroth bee hive 10. When the insulating wrap 40 is wrapped around the at least one upper hive body 16 and the at least one lower hive body 18 (not visible in FIG. 5), and when the hook and loop closure 46 is closed, the lower edge 58 of the insulating wrap 40 is level with the top of the bottom board 24, and may further sit upon the ledge 28 if so provided. The entrance 26 remains exposed for the passage of bees. Together, the single piece weather proof inner and outer cover 42, the corners 54 and corner seams 56, and the four rigid foam board cores 44 (not visible in FIG. 5) cooperate to maintain vertical rigidity in the insulating wrap 40. As a result, the upper standing or projecting seam 50 of the upper edge 48 of the insulating wrap 40 may in some embodiments barely touch the edge of the hive lid or outer cover 12, or may in some embodiments be pressed into engagement with the edge of the hive lid or outer cover 12, or may even in some embodiments stop short of touching the edge of the hive lid or outer cover 12, thereby leaving a tightly controlled gap therebetween.

In each case, the upper standing or projecting seam 50 of the upper edge 48 of the insulating wrap 40 is adjacent to the hive lid or outer cover 12, according to the definition of adjacent that may or may not imply actual contact but does imply close proximity. The tightly controlled gap, if present, may therefore be between an eighth of an inch and an inch, provided that such tightly controlled gap remains consistent, i.e.—the insulating wrap 40 may be removed and reinstalled without introducing excessive variation in the gap. The upper standing or projecting seam 50 with its extended seam allowance 52 therefore in some embodiments acts as a seal against the edge of the hive lid or outer cover 12, or in some embodiments provides a closely defined airspace, thereby better minimizing and/or controlling passage of air to properly ventilate the hive, according to the experience and desires of the bee keeper.

Figure 6:
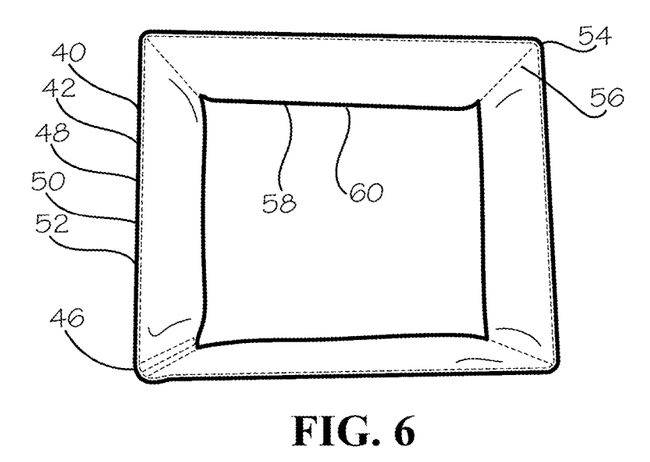
FIG. 6 is a top view of an embodiment of the Improved Insulating Wrap for Bee Hives, as described herein.
Figure 7:
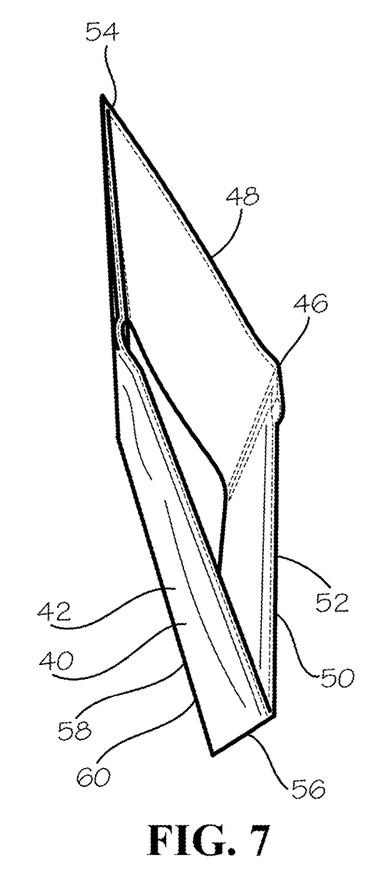
FIG. 7 is a top perspective view of an embodiment of the Improved Insulating Wrap for Bee Hives in a folded state for storage, as described herein.
Figure 8:
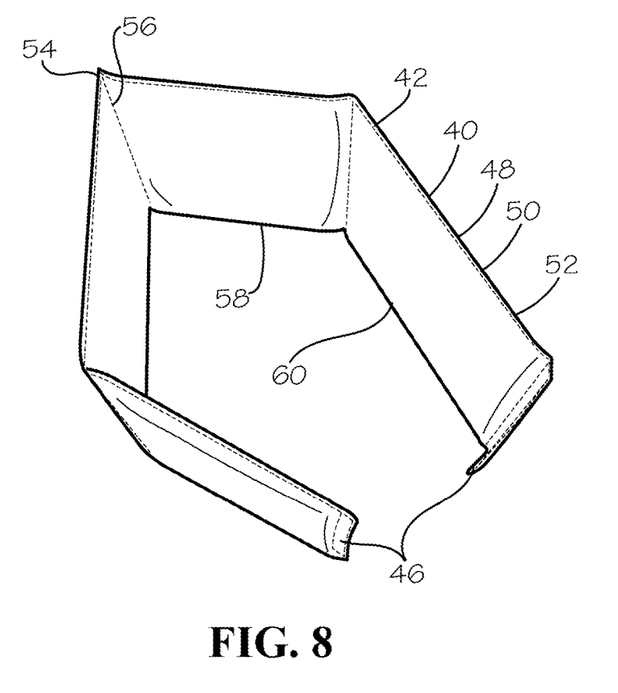
FIG. 8 is a top perspective view of an embodiment of the Improved Insulating Wrap for Bee Hives in an open state in preparation for installation, as described herein.

Turning now to FIGS. 6, 7, and 8, further embodiments of the insulating wrap 40 are shown. The insulating wrap 40 is again constructed from a single piece weather proof inner and outer cover 42 that encompasses four rigid foam board cores 44 (not visible in FIGS. 6, 7, and 8). The single piece weather proof inner and outer cover 42 is again wrapped 60 around the lower edges 58 of the four rigid foam board cores 44, and is again stitched together along the upper edges 48 of the four rigid foam board cores 44 using an upper standing or projecting seam 50. The upper standing or projecting seam 50 is again provided with an extended seam allowance 52. Each of the four rigid foam board cores 44 is again separated from the next by a corner seam 56 located at corners 54. The corner seams 56 again function in conjunction with the flexibility of the single piece weather proof inner and outer cover 42 as living hinges between each of the four rigid foam board cores 44. The ends of the single piece weather proof inner and outer cover 42 are again closed by seams, so that the first and fourth rigid foam board cores 44 are fully enveloped.

The embodiments of the insulating wrap 40 in FIGS. 6, 7, and 8 are shown in various configurations. The embodiment of the insulating wrap 40 in FIG. 6 is shown as configured when already installed over the Langstroth bee hive 10, with the hook and loop closure 46 closed. The embodiment of the insulating wrap 40 in FIG. 8 is shown with the hook and loop closure 46 open, in preparation for installing the insulating wrap 40 over the Langstroth bee hive 10. The embodiment of the insulating wrap 40 in FIG. 7 is shown in an (almost) flattened configuration suitable for efficient storage.

While the Improved Insulating Wrap for Bee Hives has been described with respect to at least one embodiment, the Improved Insulating Wrap for Bee Hives can be further modified within the spirit and scope of this disclosure. This application is therefore intended to cover any variations, uses, or adaptations of the Improved Insulating Wrap for Bee Hives using its general principles. Further, this application is intended to cover such departures from the present disclosure as come within known or customary practice in the art to which the disclosure pertains and which fall within the limits of the appended claims.

REFERENCE NUMBER LISTING

| 10 | Langstroth bee hive |
|---|---|
| 12 | Hive lid or outer cover |
| 14 | Inner cover |
| 16 | Upper hive body |
| 18 | Lower hive body |

-continued

| 20 | Hive body handles |
| 22 | Frames |
| 24 | Bottom board |
| 26 | Entrance |
| 28 | Ledge |
| 40 | Insulating wrap |
| 42 | Single piece weather proof inner/outer cover |
| 44 | Rigid foam board core |
| 46 | Hook and loop closure |
| 48 | Upper edge |
| 50 | Upper standing or projecting seam |
| 52 | Extended seam allowance |
| 54 | Corners |
| 56 | Corner seams |
| 58 | Lower edge |
| 60 | Wrap |

What is claimed is:

1. A bee hive having an insulating wrap, comprising:
at least one hive body, a hive lid, a bottom board defining an entrance to the at least one hive body, and an insulated wrap encompassing the at least one hive body;
the insulating wrap comprising:
four foam cores having lower edges and upper edges;
a single piece inner and outer cover wrapped around the lower edges of the four foam cores and stitched together along the upper edges of the four foam cores, the stitched seam along the upper edges of the four foam cores defining a standing or projecting seam, the single piece inner and outer cover further being stitched together along corner seams between each of the four foam cores and along end seams;
the single piece inner and outer cover wrapped lower edges of the four foam cores abutting an upper surface of the bottom board;
the standing or projecting seam having an extended seam allowance, the extended seam allowance being at least one of:
in direct contact with a lower surface of the hive lid, in compressed contact with the lower surface of the hive lid, and separated from the lower surface of the hive lid by a controlled gap; and
a closure adapted to connect the ends of the insulating wrap adjacent to the end seams.

2. The bee hive of claim 1, wherein:
the four foam cores further comprise four rigid foam board cores.

3. The bee hive of claim 2, wherein:
the standing or projecting seam further comprising at least one of a plain stitched seam, a double stitched seam, a welted seam, a double welted seam, a piped seam, a corded seam, a bonded seam, and a welded seam.

4. The bee hive of claim 2, wherein:
the bottom board is further provided with a ledge upon which the lower edge of the insulating wrap rests.

5. The bee hive of claim 1, wherein:
the single piece inner and outer cover is constructed of black 18-ounce marine vinyl coated polyester.

6. The bee hive of claim 2, wherein:
the four rigid foam board cores are constructed of ½ inch foam board insulation with an R-value of 3.

7. An insulating wrap for a bee hive, comprising:
four foam cores having lower edges and upper edges;
a single piece inner and outer cover wrapped around the lower edges of the four foam cores and stitched together along the upper edges of the four foam cores, the stitched seam along the upper edges of the four foam cores defining a standing or projecting seam, the single piece inner and outer cover further being stitched together along corner seams between each of the four foam cores and along end seams;
the single piece inner and outer cover wrapped lower edges of the four foam cores being configured to abut an upper surface of a bottom board of the bee hive;
the standing or projecting seam having an extended seam allowance, the extended seam allowance configured to extend to adjacent a lower edge of a hive lid of the bee hive when the insulating wrap is engaged with the bee hive, and adapted to be at least one of:
in direct contact with a lower surface of the hive lid, in compressed contact with the lower surface of the hive lid, and separated from the lower surface of the hive lid by a controlled gap; and
a closure adapted to connect the ends of the insulating wrap adjacent to the end seams.

8. The insulating wrap of claim 7, wherein:
the four foam cores further comprise four rigid foam board cores.

9. The insulating wrap of claim 8, wherein:
the standing or projecting seam further comprising at least one of a plain stitched seam, a double stitched seam, a welted seam, a double welted seam, a piped seam, a corded seam, a bonded seam, and a welded seam.

10. The insulating wrap of claim 7, wherein:
the single piece inner and outer cover is constructed of black 18-ounce marine vinyl coated polyester.

11. The insulating wrap of claim 8, wherein:
the four rigid foam board cores are constructed of ½ inch foam board insulation with an R-value of 3.

12. A method for insulating bee hives, comprising the steps of:
constructing an insulating wrap by wrapping a single piece inner and outer cover around the lower edges of four foam board cores and stitching the single piece inner and outer cover together along the upper edges of the four foam board cores;
defining a standing or projecting seam using the stitched seam having an extended seam allowance along the upper edges of the four foam board cores;
stitching together along corner seams the single piece inner and outer cover between each of the four foam board cores and along end seams;
adapting a closure to connect the ends of the insulating wrap adjacent to the end seams;
encompassing with the insulated wrap at least one hive body of each bee hive;
abutting an upper surface of a bottom board of each bee hive with the single piece inner and outer cover wrapped lower edges of the four foam cores; and
placing the extended seam allowance at least one of:
in direct contact with a lower surface of the hive lid, in compressed contact with the lower surface of the hive lid, and separated from the lower surface of the hive lid by a controlled gap.

13. The method of claim 12, wherein:
the four foam cores further comprise four rigid foam board cores.

14. The method of claim 13, wherein:
the standing or projecting seam further comprising at least one of a plain stitched seam, a double stitched seam, a welted seam, a double welted seam, a piped seam, a corded seam, a bonded seam, and a welded seam.

15. The method of claim 13, further comprising the steps of:
provi­ding the bottom board of each bee hive with a ledge; and
resting the lower edge of the insulating wrap on the ledge.

16. The method of claim 12, further comprising the steps of:
constructing the single piece inner and outer cover from black 18-ounce marine vinyl coated polyester.

17. The method of claim 13, further comprising the steps of:
constructing the four rigid foam board cores from ½ inch foam board insulation with an R-value of 3.

18. The bee hive of claim 1, wherein:
the insulated wrap being in direct contact with the at least one hive body.

19. The insulating wrap of claim 7, wherein:
the insulating wrap being configured to be in direct contact with at least one hive body of the bee hive when the insulating wrap is engaged with the bee hive.

20. The method of claim 12, further comprising the step of:
configuring the insulated wrap to be in direct contact with at least one hive body of the bee hive when the insulating wrap is engaged with the bee hive.

* * * * *